United States Patent
Syed et al.

(10) Patent No.: US 7,702,862 B2
(45) Date of Patent: Apr. 20, 2010

(54) METRICS MODULES AND METHODS FOR MONITORING, ANALYZING AND OPTIMIZING BUS AND MEMORY OPERATIONS IN A COMPLEX INTEGRATED CIRCUIT

(75) Inventors: Moinul I. Syed, Austin, TX (US); Richard A. Gentile, Natick, MA (US); Gregory T. Koker, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 423 days.

(21) Appl. No.: 11/704,143

(22) Filed: Feb. 8, 2007

(65) Prior Publication Data

US 2008/0195825 A1 Aug. 14, 2008

(51) Int. Cl.
*G06F 12/00* (2006.01)
*G06F 11/34* (2006.01)

(52) U.S. Cl. .............................. 711/154; 714/E11.201; 714/E11.205

(58) Field of Classification Search ........................ None
See application file for complete search history.

(56) References Cited

U.S. PATENT DOCUMENTS

| | | | |
|---|---|---|---|
| 6,073,225 A | | 6/2000 | James et al. |
| 6,112,318 A | * | 8/2000 | Jouppi et al. ................... 714/47 |
| 6,330,647 B1 | * | 12/2001 | Jeddeloh et al. ............. 711/158 |
| 6,460,107 B1 | | 10/2002 | Rao et al. |
| 6,857,055 B2 | * | 2/2005 | Jeddeloh ...................... 711/163 |
| 7,500,123 B2 | * | 3/2009 | Luong et al. ................. 713/322 |
| 2005/0289377 A1 | * | 12/2005 | Luong et al. ................. 713/322 |

FOREIGN PATENT DOCUMENTS

EP    0 897 152 A2    2/1999

OTHER PUBLICATIONS

Search Report and Written Opinion mailed Jun. 10, 2008 from International Application No. PCT/US2008/001144.

* cited by examiner

*Primary Examiner*—Kevin Verbrugge
(74) *Attorney, Agent, or Firm*—Goodwin Procter LLP

(57) ABSTRACT

A processing system includes a processing circuit having one or more buses, a memory interface unit to control access by the processing circuit to a memory, and a metrics module. The metrics module includes one or more metrics registers and a metrics controller to monitor one or more operations selected from memory interface unit operations and bus operations, and to store metrics information corresponding to the monitored operations in the metrics registers. The monitored operations can include memory access operations, arbitration operations, bus operations, and the like. The metrics information can be analyzed to provide a basis for improving performance of a program that is executed on the processing system.

42 Claims, 5 Drawing Sheets

METRICS MODULES AND METHODS FOR MONITORING, ANALYZING AND OPTIMIZING BUS AND MEMORY OPERATIONS IN A COMPLEX INTEGRATED CIRCUIT

FIELD OF THE INVENTION

The present invention relates to digital processing systems and, more particularly, to methods and apparatus for acquiring metrics information corresponding to bus and memory operations in a complex integrated circuit.

BACKGROUND OF THE INVENTION

Embedded processors may include a digital signal processor, a microcontroller, one or more DMA controllers and memory on a single integrated circuit chip. The performance of the embedded processor is largely determined by the associated memory system and, in particular, by a memory system that is external to the processor chip.

In an embedded system application, memory management is a critical part of developing a high performance system. In particular, because the data buffers and the instruction code are often too large to fit within internal memory, care must be taken in placing code and data to achieve the best performance. When an external memory, such as DDR SDRAM (double data rate synchronous dynamic random access memory) is used in a system, there are many factors that can negatively impact performance. As an example, accesses to inactive rows within DDR SDRAM require a row activation command by the external bus controller, which takes multiple memory clocks to execute. There are further performance penalties if consecutive accesses are made to different rows in the same internal bank of a SDRAM, in which case the controller must first deactivate the current row before it can activate the new row. If the external bus controller can keep track of rows in external memory that have been already activated, excessive row activation commands and the corresponding extra clock cycles can be avoided. Also, because of latencies associated with consecutive read and write accesses on the external bus, intermixing accesses can result in slower performance than accessing data in a more pipelined fashion.

Currently, there is no good way for a programmer to monitor what is happening in an application being executed on hardware. While simulation tools may exist, there is no good way to profile the activity at the external buses as reads and writes are made by the DMA controller and the core. As a result, programmers are forced into a trial and error method of moving data and code within external memory in search of the best performance.

SUMMARY OF THE INVENTION

A set of metrics registers can be used to collect metrics information on the access pattern to external memory in order to characterize how the processing circuit accesses data and code. The registers allow programmers to collect metrics information over a monitoring period, for example, the time between entering and exiting a function. The metrics registers can be used to determine the total accesses to external memory (reads and writes), as well as the total number of accesses in each memory bank. The registers can also collect information on the number of "turnarounds" on the external bus. The registers can be programmed to collect information on arbitration between multiple requesters in the system trying to access external memory. The registers can be used to monitor other information, including, but not limited to, bus operations, DMA transfers, latencies, and the like.

The registers can be used directly by a programmer to assist in determining the proper placement of code and data in external memory. The registers can also be used by a tool to plot visually the access pattern to external memory. The programmer is given information that otherwise would be impossible to obtain. Using the metrics information collected, programmers can better manage data and code by taking advantage of the resources and features of the external memory controller, internal memory and external memory.

According to a first aspect of the invention, a processing system comprises a processing circuit including one or more buses, a memory interface unit to control access by the processing circuit to a memory, and a metrics module comprising one or more metrics registers and a metrics controller to monitor one or more operations selected from memory interface unit operations and bus operations, and to store metrics information corresponding to the monitored operations in the metrics registers.

According to another aspect of the invention, a method is provided for collecting metrics information in a processing system that comprises a processing circuit including one or more buses and a memory interface unit to control access by the processing circuit to a memory. The method comprises monitoring an operation selected from memory interface unit operations and bus operations during a selected monitoring period of program execution, storing metrics information corresponding to the monitored operation in a metrics register, and reading the stored metrics information in the metrics register to provide an indication of performance of the processing system.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
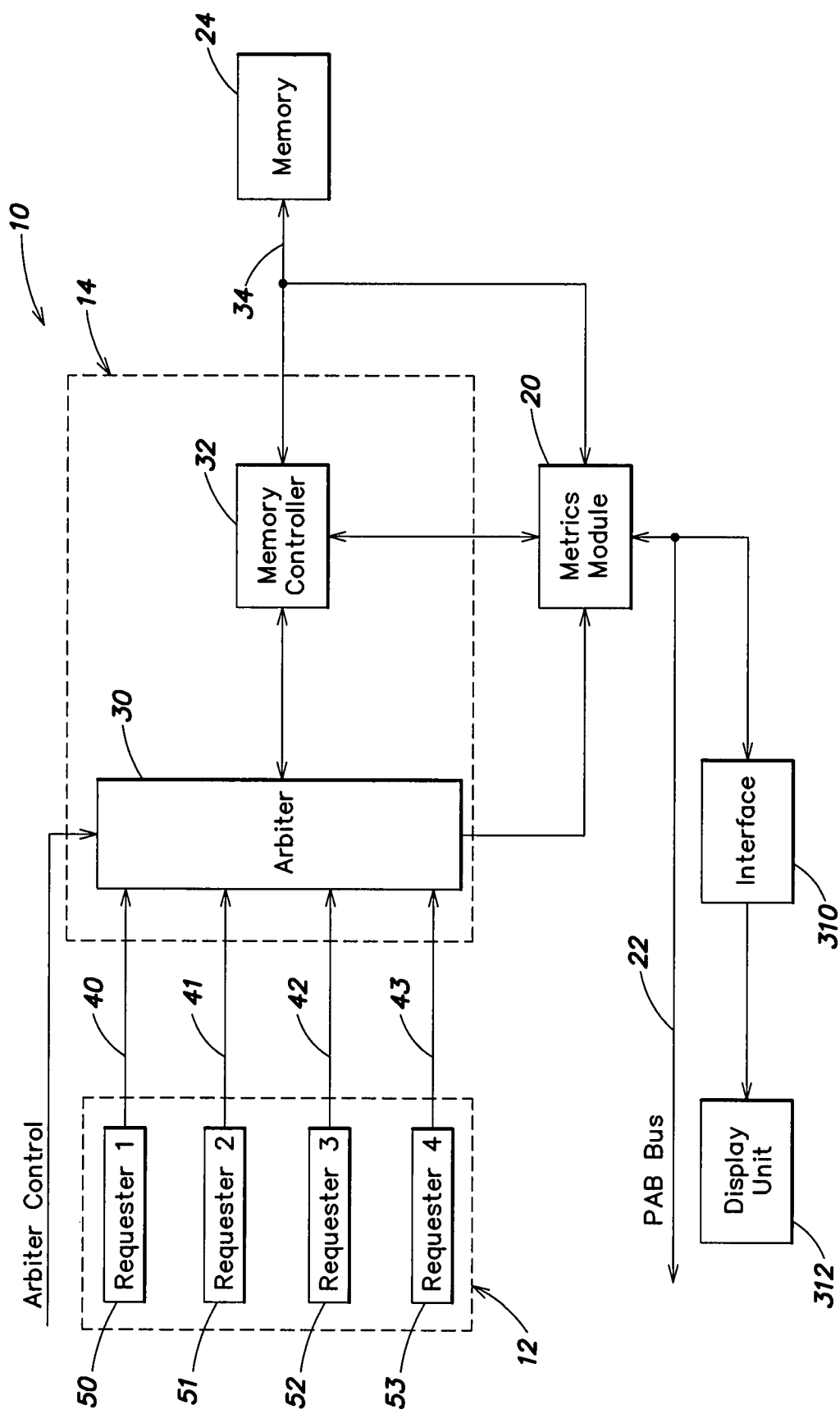
FIG. 1 is a schematic block diagram of a processing system in accordance with a first embodiment of the invention.

A block diagram of a processing system and memory in accordance with a first embodiment of the invention is shown in FIG. 1. A processing system 10 includes a processing circuit 12, a memory interface unit 14 and a metrics module 20. The memory interface unit 14 controls access by the processing circuit 12 to a memory 24. The memory 24 may be a synchronous memory, such as DDR SDRAM, or an asynchronous memory, such as SRAM (Static Random Access Memory). The metrics module 20 monitors one or more operations by the memory interface unit 14 and stores metrics information corresponding to the monitored operations.

In the embodiment of FIG. 1, processing circuit 12, memory interface unit 14 and metrics module 20 are fabricated on a single integrated circuit chip, and memory 24 may be external to the integrated circuit chip. In this embodiment, processing system 10 is an embedded processing system. Memory interface unit 14 includes an arbiter 30 and a memory controller 32. Memory interface unit 14 is coupled to memory 24 by an external bus 34 and is coupled to processing circuit 12 by buses 40, 41, 42 and 43.

Metrics module 20 is coupled to memory interface unit 14 and monitors operations by memory interface unit 14 as described below. A peripheral access bus (PAB) 22 coupled to metrics module 20 is used for controlling metrics module 20 and for reading metrics information from metrics module 20, as described below.

In the example of FIG. 1, processing circuit 12 includes requesters 50, 51, 52 and 53, each of which may independently request access to memory 24. Each requester, for example, may be a core processor of a digital signal processor, a microcontroller, a microprocessor or a DMA controller. In other embodiments, processing circuit 12 may include more or fewer requesters. If the processing circuit 12 includes a single requester, arbiter 30 is not required in memory interface unit 14.

Figure 2:
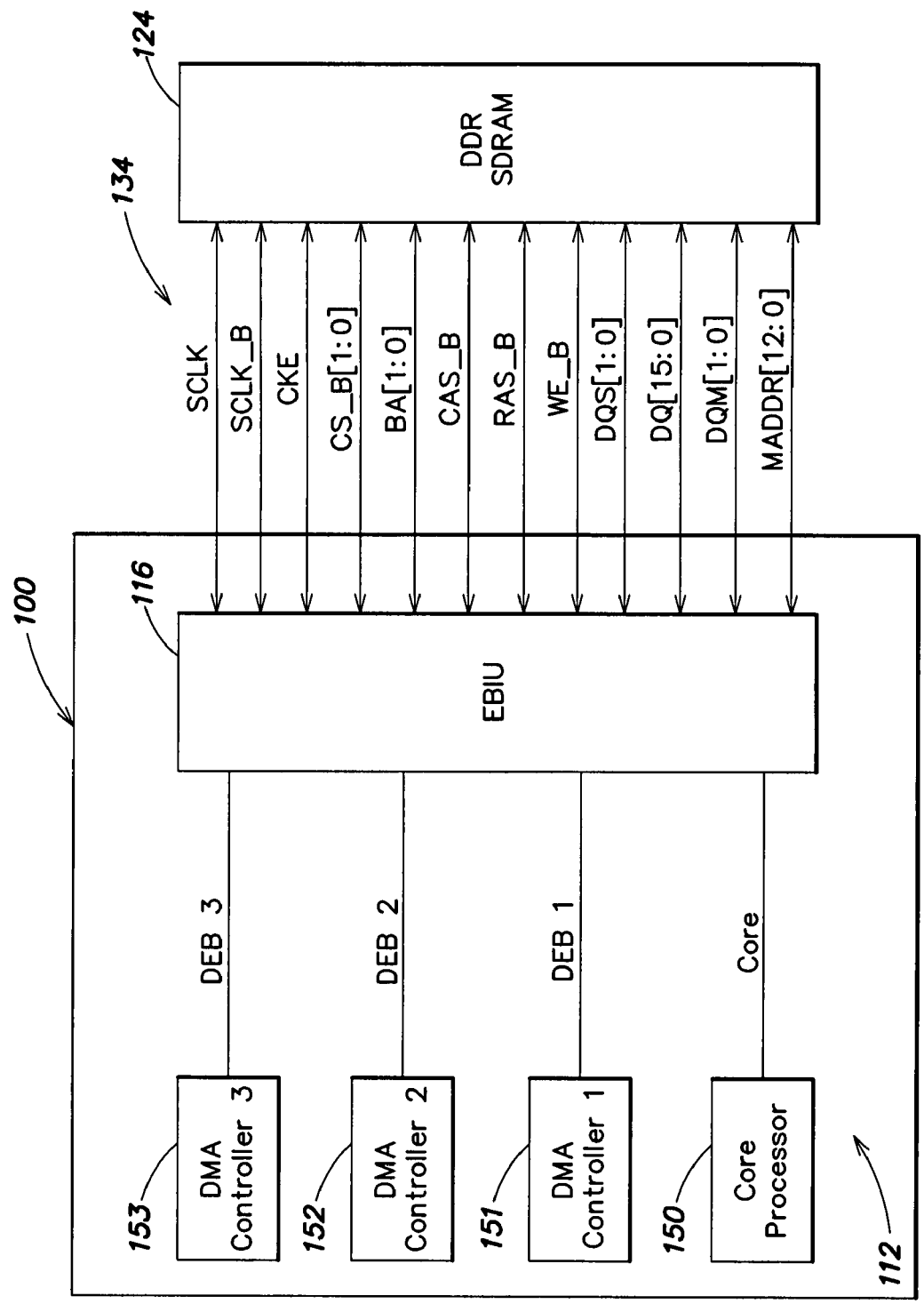
FIG. 2 is a block diagram of a processing system and external memory in accordance with a second embodiment of the invention.
Figure 3:
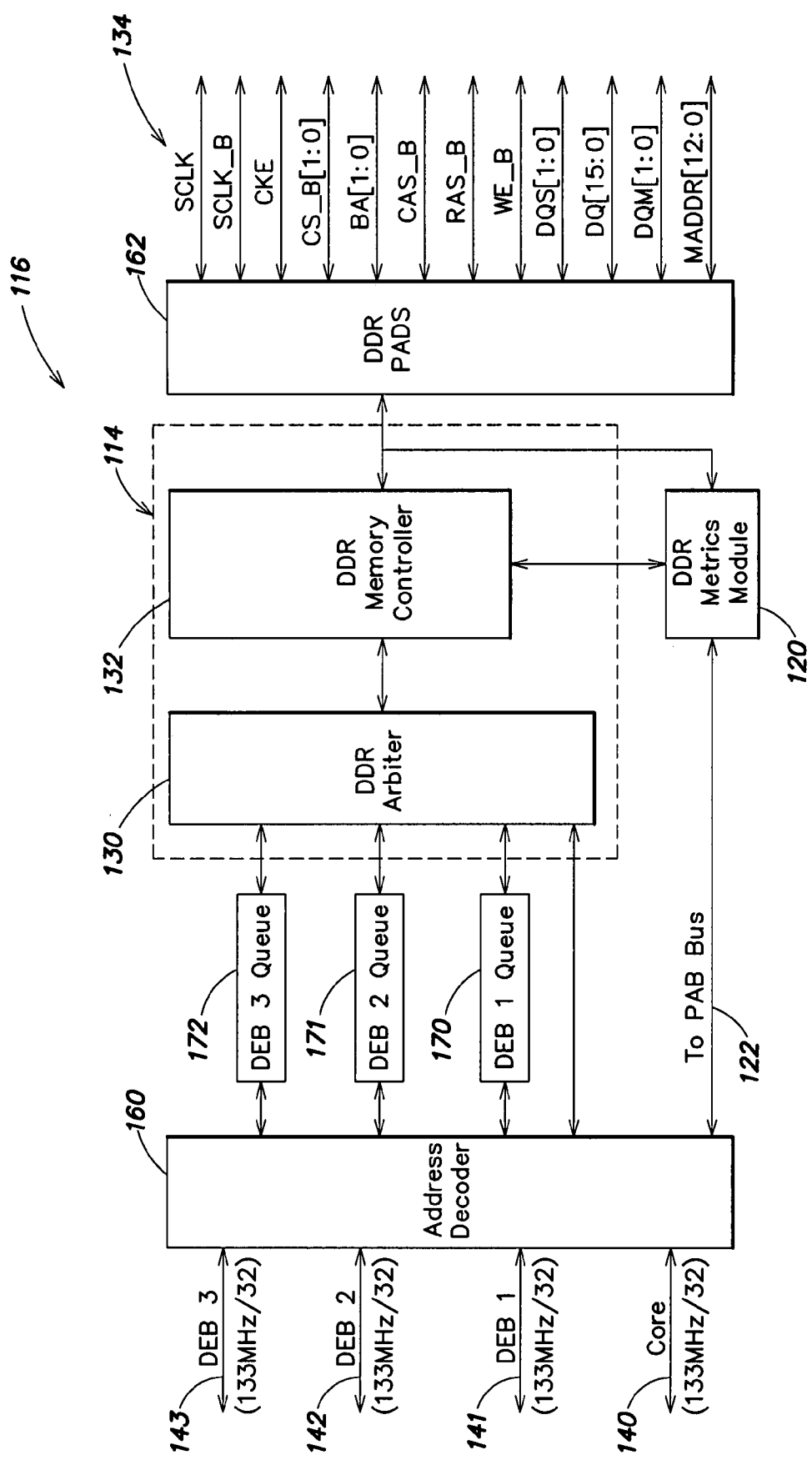
FIG. 3 is a block diagram of the external bus interface unit shown in FIG. 2.

A block diagram of a processing system and external memory in accordance with a second embodiment of the invention is shown in FIG. 2. A block diagram of the external bus interface unit of FIG. 2 is shown in FIG. 3. A processing system 100 accesses an external memory 124. In the embodiment of FIGS. 2 and 3, memory 124 is a DDR SDRAM. Processing system 10 includes a processing circuit 112 and an external bus interface unit (EBIU) 116. Processing circuit 112 includes core processor 150 and DMA controllers 151, 152 and 153. Memory access requests are sent by core processor 150 and DMA controllers 151, 152 and 153 on buses 140, 141, 142 and 143, respectively.

As shown in FIG. 3, external bus interface unit 116 may include a memory interface unit 114 and a metrics module 120. Metrics module 120 is coupled to memory interface unit 114 and to a peripheral access bus (PAB) 122. The peripheral access bus 122 is used to write control information to metrics module 120 and to read metrics information from metrics module 120. Memory interface unit 114 includes a DDR arbiter 130 and a DDR memory controller 132. Memory controller 132 is coupled through pads 162 and an external bus 134 to memory 124. External bus interface unit 116 may further include an address decoder 160 and DMA queues 170, 171 and 172. The external bus interface unit 116 may include additional circuitry (not shown). By way of example only, the processing system 100 shown in FIGS. 2 and 3 may represent a Blackfin digital signal processor available from Analog Devices, Inc.

Figure 4:
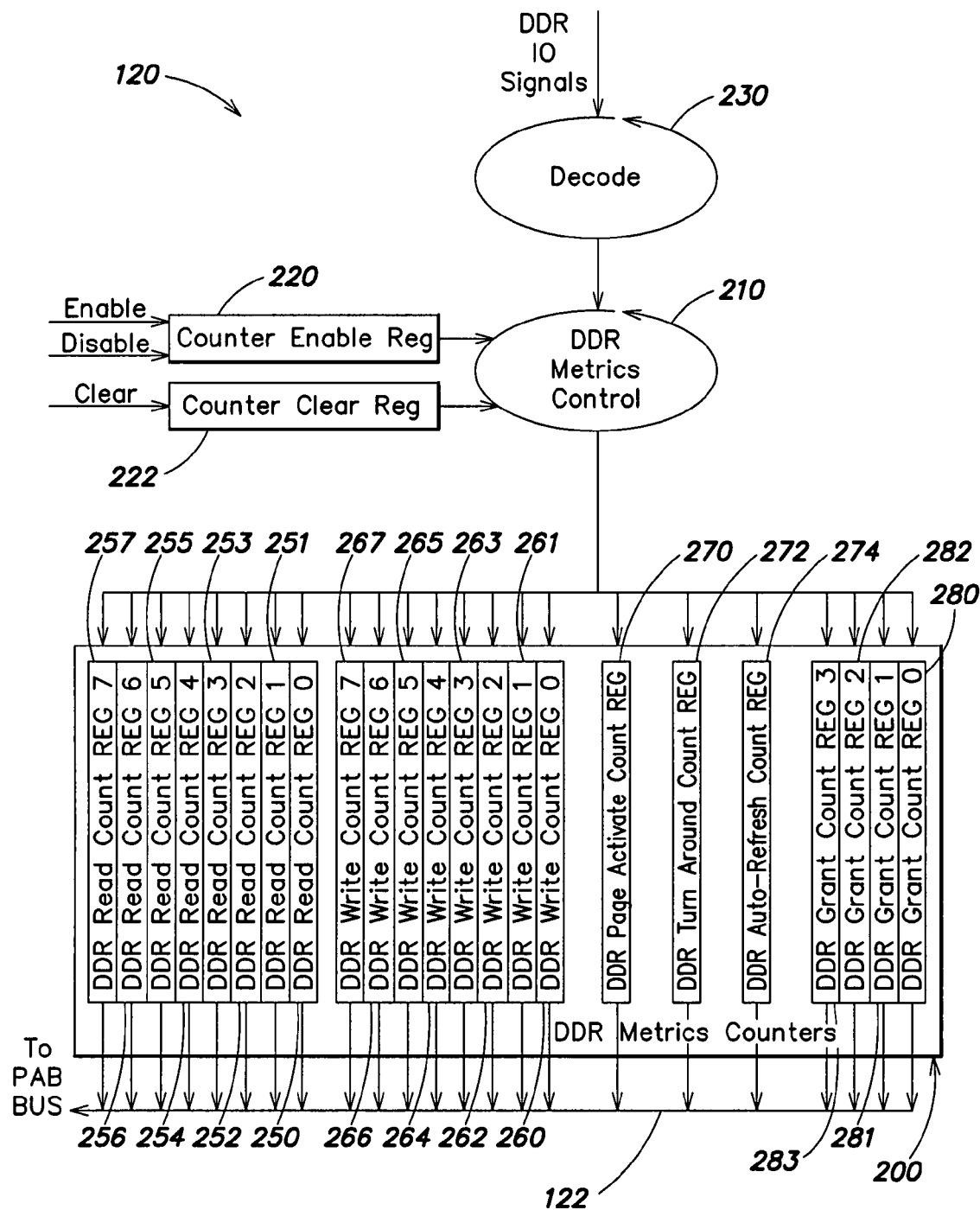
FIG. 4 is a block diagram of the metrics module shown in FIGS. 1 and 3.

A block diagram of metrics module 120 of FIG. 3 is shown in FIG. 4. The metrics module of FIG. 4 may also correspond to metrics module 20 shown in FIG. 1. Metrics module 120 includes metrics registers 200 and a metrics controller 210. The metrics controller 210 controls monitoring of one or more operations by memory interface unit 114 and stores metrics information regarding the monitored operations in metrics registers 200. Metrics module 120 may further include one or more control registers to store metrics module control information. In the embodiment of FIG. 4, the control registers include a counter enable register 220 and a counter clear register 222. Metrics module 120 may further include a decoder 230 to decode memory interface unit 114 signals.

Metrics module 120 monitors selected operations by memory interface unit 114 and stores metrics information regarding the monitored operations in metrics registers 200. Typically, the monitored operations are counted during a monitoring period and the count of each monitored operation is stored in one of the metrics registers. In particular, each of the metrics registers may be configured as a counter which is incremented on each occurrence of the operation being monitored. Thus, the metrics register holds a count of the monitored operation.

Metrics module 120 may monitor operations by memory controller 132, operations by arbiter 130, or both. Metrics module 120 may monitor one or more of read access operations, write access operations, turnarounds between read and write commands or between write and read commands, activate commands, auto-refresh commands, total arbitration grants to a selected requester, arbitration write grants to a selected requester, arbitration read grants to a selected requester and arbitration prefetch grants to a selected requester.

Metrics registers 200 include registers which monitor memory access operations by memory controller 132. As shown in FIG. 4, metrics registers 200 include eight read count registers 250-257, each of which counts read accesses to a corresponding bank of memory 124. Metrics registers 200 further include eight write count registers 260-267, each of which counts write accesses to a corresponding bank of memory 124. It will be understood that metrics registers 200 may include more or fewer than eight read count registers and more or fewer than eight write count registers. A page activate count register 270 counts the total number of times the page activate command is issued to memory 124, for all banks. A turnaround count register 272 counts the total number of times there was a turnaround between read and write or between write and read commands, for all banks. An auto-refresh count register 274 counts the total number of times an auto-refresh command was issued to memory 124, for all banks.

Metrics registers 200 further include four grant count registers 280-283, which monitor arbitration operations by arbiter 130. These registers may be used to monitor how the four requesters, including core processor 150 and DMA controllers 151, 152 and 153, are granted access to memory 124. Grant count register 280 counts, when enabled, the total number of times that core processor 150 was granted access to memory 124, if the grant control bits of the counter enable register 220 are set to zero. Grant count register 281, when enabled, counts the total number of times that DMA controller 151 was granted access to memory 124, if the grant control bits of the counter enable register 220 are set to zero. Grant control register 282 counts, when enabled, the total number of times that DMA controller 152 was granted access to memory 124, if the grant control bits of the counter enable register 220 are set to zero. Grant control register 283 counts, when enabled, the total number of times that DMA controller 153 was granted access to memory 124, if the grant control bits of counter enable register 220 are set to zero.

The grant control registers 280-283 can be configured in different ways, depending on a grant control field of counter enable register 220. The grant control field in this embodiment is 2 bits. The number of bits in the grant control field can be increased to control monitoring of additional operations on other system buses and other external memory interfaces.

When the grant control field is set to 00, grant count registers 280-283 count the number of grants to core processor 150 and DMA controllers 151, 152 and 153, respectively, for access requests to memory 124.

When the grant control field is set to 01, grant count register 281 counts the number of grants given to DMA controller 151 write requests, grant count register 282 counts the number of grants given to DMA controller 151 read requests and grant count register 283 counts the number of grants given to DMA controller 151 prefetch read requests. Grant count register 280 counts the number of grants given to core processor 150.

When the grant control field is set to 10, grant count register 281 counts the number of grants given to DMA controller 152 write requests, grant count register 282 counts the number of grants given to DMA controller 152 read requests, and grant count register 283 counts the number of grants given to DMA controller 152 prefetch read requests. Grant count register 280 counts the number of grants given to core processor 150.

When the grant control field is set to 11, grant count register 281 counts the number of grants given to DMA controller 153 write requests, grant count register 282 counts the number of grants given to DMA controller 153 read requests, and grant count register 283 counts the number of grants given to DMA controller 153 prefetch read requests. Grant count register 280 counts the number of grants given to core processor 150.

It will be understood that different combinations of operations can be monitored, for each value of the grant control field. Furthermore, the number of grant counter options can be increased by increasing the number of bits in the grant control field.

The counter enable register 220 controls independent enabling and disabling of metrics registers. Each bit in this register, except for the grant control field described above, controls enabling and disabling of a corresponding metrics register. When a bit is set to one, the corresponding metrics register is enabled to begin counting. When a bit is set to zero, the corresponding metrics register is disabled and stops counting but is not cleared. Thus, the monitoring period for each metrics register begins when the corresponding bit in counter enable register 220 is set to one and ends when the same bit is set to zero. The corresponding bit in the counter clear register 222 must be set to clear the register. In this embodiment, the grant control field contains two bits which define the operations to be monitored by each of the grant count registers.

The counter clear register 222 controls independent clearing of metrics registers. Each bit in this register, when set to one, clears a corresponding metrics register. Writing zero in a bit position has no effect on the corresponding metrics register. This register is used to clear the corresponding metrics registers before starting the counters.

Peripheral access bus (PAB) 122 may be used for writing control information, including register enable and disable information, register clear information and grant control information, to counter enable register 220 and counter clear register 222. In addition, peripheral access bus 122 may be used for reading metrics information from metrics registers 200.

The operations of memory interface unit 114 may be monitored by monitoring output signals from memory controller 132, input signals to arbiter 130 and internal signals of memory controller 132 and arbiter 130 as needed to monitor an operation of interest. For example, read access operations and write access operations to a selected bank of memory 124 may be monitored by monitoring signals on external bus 134, such as write enable (WE), clock enable (CKE), chip select (CS), row address select (RAS), column address select (CAS) and bank address (BA) signals, and by decoding memory address lines on external bus 134. Other operations can be monitored in a similar manner.

Metrics registers 200 have been described as including a specific set of registers for monitoring specified operations. It will be understood that more or fewer metrics registers may be utilized within the scope of the invention and that the metrics registers may monitor other operations associated with the processing system. For example, metrics registers 200 may be utilized to monitor other bus operations of the processing system, such as operations on one or more of buses 140, 141, 142 and 143 shown in FIG. 3. In addition, metrics registers 200 may be utilized to monitor DMA transfers to on-chip memory, such as level 1 and level 2 on-chip memory. Furthermore, metrics registers 200 may be used to monitor transfers by core processor 150 and DMA controllers 151, 152 and 153 to and from an asynchronous memory, such as asynchronous SRAM. In this case, external bus interface unit 116 may include a memory interface unit for access to external asynchronous memory. In addition, metrics registers 200 may be utilized to monitor average and peak arbitration latencies inside the external bus interface unit 116 and to measure average and peak access latencies through external bus interface unit 116 to synchronous or asynchronous memory. In the case of measuring latencies, the metrics register stores a count of clock cycles between two specified events. It will be understood that these operations are given by way of example only and are not limiting as to the operations that can be monitored within the scope of the invention.

The grant control field has been described as defining the arbitration operations to be monitored by each of the grant count registers. It will be understood that different control fields may be utilized to define operations to be monitored by other metrics registers. For example, a control field may be utilized to define operations to be monitored by specified metrics registers. The number of bits in the control field determines the number of available options. The use of control fields increases the flexibility of the metrics module and may permit the number of metrics registers to be reduced.

Figure 5:
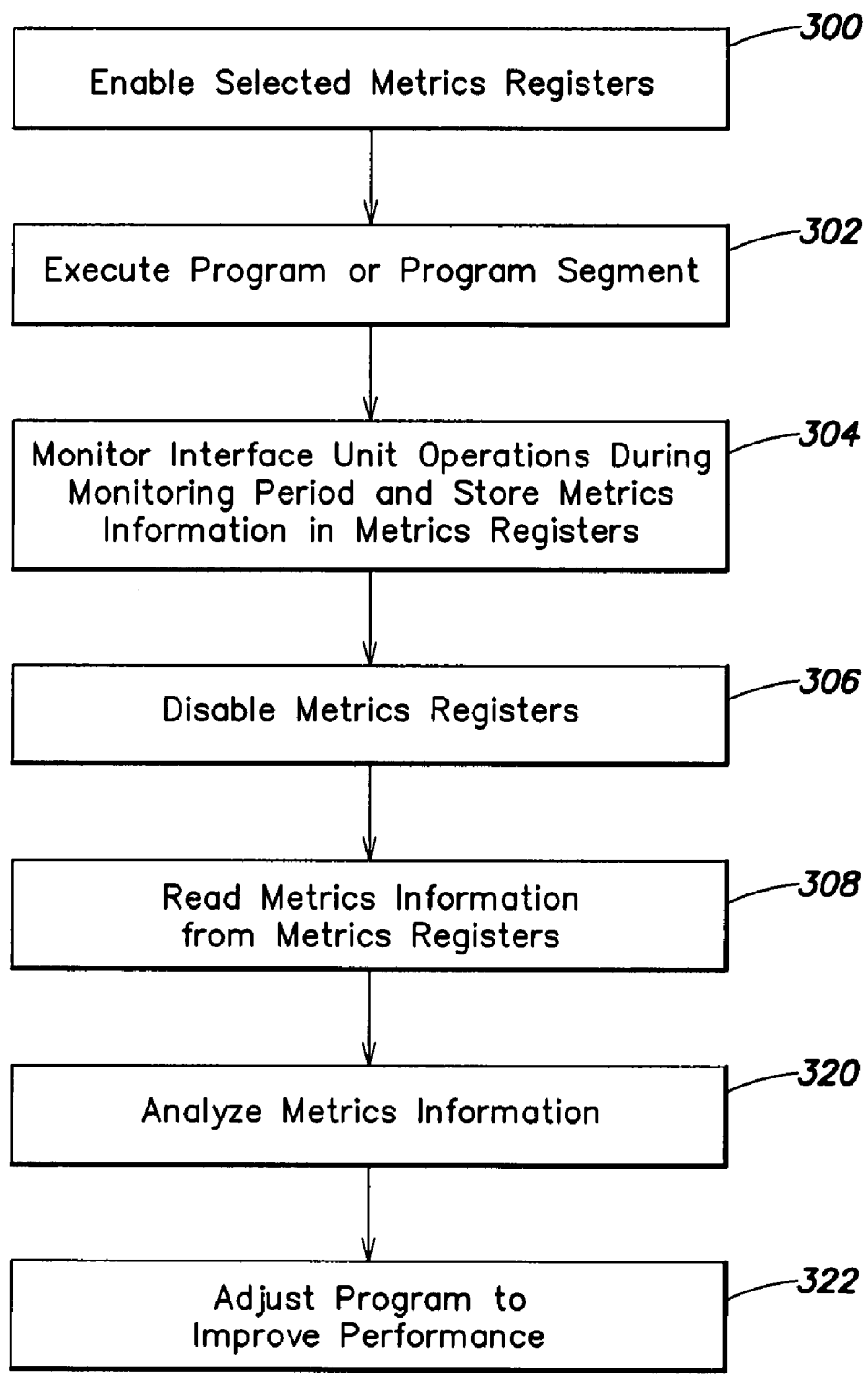
FIG. 5 is a flow diagram that illustrates metrics monitoring in accordance with an embodiment of the invention.

A flow diagram that illustrates metrics monitoring in accordance with an embodiment of the invention is shown in FIG. 5. A programmer may utilize the metrics module described herein to improve the performance of a program or a portion of a program during program development.

Referring to FIG. 5, selected metrics registers are enabled in step 300. As described above, each metrics register is enabled by setting a corresponding bit in counter enable register 220 (FIG. 4). Thus, all or selected ones of the metrics registers can be enabled. In addition, the grant control field of counter enable register 220 can be set to a desired value. Prior to monitoring, the metrics registers are cleared via counter clear register 222 as described above. The metrics registers can be enabled by writing the appropriate bits to counter enable register 220 at the start of the monitoring period.

In step 302, a program or program segment is executed. The metrics module may monitor a selected routine, a portion of a routine, or several routines. In step 304, the operations of interest are monitored during a monitoring period and metrics information corresponding to the monitored operations are stored in the metrics registers as described above. The monitoring period begins with enabling each metrics register upon entering the program or program segment of interest and ends with disabling each metrics register upon exiting the program or program segment of interest. At the end of the monitoring period, the metrics registers are disabled in step 306. The metrics registers are disabled by resetting bits corresponding to the metrics registers in counter enable register 220.

After disabling of the metrics registers, the metrics registers contain metrics information corresponding to the monitored operations. In step 308, the metrics information is read from the metrics registers, using for example an interface 310 coupled to peripheral access bus 22, as shown in FIG. 1. The interface 310 may be part of the embedded processor. The metrics information can be presented on a display unit 312. For example, a metrics information display may identify the monitoring period and may list each monitored operation and the corresponding count of each monitored operation during the monitoring period.

In step 320, the programmer analyzes the metrics information to determine if program performance can be improved. For example, if the metrics information indicates an excessive number of accesses to external memory during a critical part of program execution, the programmer can modify memory locations of code and/or data to improve performance. Also, if the arbitration grant information indicates an imbalance in arbitration grants which adversely affects performance, the arbitration protocol can be adjusted to improve performance. Such adjustments are made in step 322. Since digital signal computations typically require frequent memory accesses and are repetitive in nature, small adjustments based on analysis of the metrics information can yield significant performance improvements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A processing system comprising:
   a memory interface unit comprising a memory controller and an arbiter configured to receive requests from a processing circuit including a plurality of requesters, wherein the arbiter selects one of the requesters when more than one requester simultaneously requests memory access; and
   a metrics module which accepts inputs from both the memory controller and the arbiter, the module comprising and a metrics controller to monitor one or more operations and one or more metrics registers to store metrics information relating to the monitored operations, wherein the operations monitored include operations generated by the memory controller and the arbiter independently of the processing circuit.

2. A processing system as defined in claim 1, wherein at least one of the metrics registers stores a count of a selected operation.

3. A processing system as defined in claim 1, wherein at least one of the metrics registers monitors read access operations by the memory interface unit.

4. A processing system as defined in claim 1, wherein at least one of the metrics registers monitors write access operations by the memory interface unit.

5. A processing system as defined in claim 1, wherein at least one of the metrics registers monitors turnarounds between and read and write commands by the memory interface unit.

6. A processing system as defined in claim 1, wherein at least one of the metrics registers monitors activate commands issued to the memory by the memory interface unit.

7. A processing system as defined in claim 1, wherein at least one of the metrics registers monitors autorefresh commands issued to the memory by the memory interface unit.

8. A processing system as defined in claim 1, wherein at least one of the metrics registers monitors arbitration grants to a selected requester of the processing circuit.

9. A processing system as defined in claim 1, wherein at least one of the metrics registers monitors arbitration write grants to a selected requester of the processing circuit.

10. A processing system as defined in claim 1, wherein at least one of the metrics registers monitors arbitration read grants to a selected requester of the processing circuit.

11. A processing system as defined in claim 1, wherein at least one of the metrics registers monitors arbitration prefetch grants to a selected requester of the processing circuit.

12. A processing system as defined in claim 1, wherein at least one of the metrics registers monitors transfers to and from an external memory.

13. A processing system as defined in claim 1, wherein at least one of the metrics registers monitors a selected operation on the one or more buses.

14. A processing system as defined in claim 1, wherein at least one of the metrics registers monitors an operation on a bus that interconnects the processing circuit and the memory interface unit.

15. A processing system as defined in claim 1, wherein at least one of the metrics registers monitors DMA transfers to a memory associated with the processing circuit.

16. A processing system as defined in claim 1, wherein at least one of the metrics registers monitors transfers to and from an asynchronous memory.

17. A processing system as defined in claim 1, wherein at least one of the metrics registers monitors transfers to and from a synchronous memory.

18. A processing system as defined in claim 1, wherein at least one of the metrics registers monitors an arbitration latency associated with the memory interface unit.

19. A processing system as defined in claim 1, wherein at least one of the metrics registers monitors a latency through the memory interface unit.

20. A processing system as defined in claim 1, wherein at least one of the metrics registers is configured to operate as a counter to count a selected operation during a monitoring period between enabling and disabling of the counter.

21. A processing system as defined in claim 1, wherein the metrics controller is programmable in response to metrics module control information.

22. A processing system as defined in claim 1, wherein the processing circuit, the memory interface unit and the metrics module are fabricated on a single integrated circuit chip and wherein the memory interface unit is configured to access a memory external to the integrated circuit chip.

23. A processing system as defined in claim 1, wherein the metrics module further includes at least one control register to store metrics module control information.

24. A processing system as defined in claim 23, wherein the at least one control register includes a counter enable register containing an enable bit corresponding to each of the metrics registers.

25. A processing system as defined in claim 24, wherein the counter enable register further includes a control field that defines operations to be counted by one or more of the metrics registers.

26. A processing system as defined in claim 24, wherein the at least one control register further includes a counter clear register containing a clear bit corresponding to each of the metrics registers.

27. A processing system as defined in claim 1, wherein the memory interface circuit comprises a memory controller to control the memory and an arbiter to arbitrate requests by two or more requesters of the processing circuit.

28. A method for collecting metrics information in a processing system that comprises a memory interface unit comprising a memory controller and an arbiter configured to receive requests from a processing circuit including a plurality of requesters, wherein the arbiter selects one of the requesters when more than one requester simultaneously requests memory access, the method comprising:

monitoring during a selected monitoring period of program execution an operation selected from memory controller operations and arbiter operations wherein the monitored operation can be performed by the memory controller and the arbiter independently of a processing circuit;

computing and storing metrics information corresponding to the monitored operation in a metrics register; and reading the stored metrics information in at least one metrics register to provide an indication of performance of the processing system.

29. A method as defined in claim 28, wherein monitoring an operation comprises counting occurrences of a selected operation and wherein storing metrics information comprises storing the count in the metrics register.

30. A method as defined in claim 29, wherein monitoring an operation further comprises enabling monitoring at the start of the monitoring period and disabling monitoring at the end of the monitoring period.

31. A method as defined in claim 28, wherein monitoring an operation comprises monitoring memory access operations.

32. A method as defined in claim 28, wherein monitoring an operation comprises monitoring arbitration grants.

33. A method as defined in claim 28, wherein monitoring an operation comprises monitoring transfers to and from an external memory.

34. A method as defined in claim 28, wherein monitoring an operation comprises monitoring an operation on the one or more buses.

35. A method as defined in claim 28, wherein monitoring an operation comprises monitoring an operation on a bus that interconnects the processing circuit and the memory interface unit.

36. A method as defined in claim 28, wherein monitoring an operation comprises monitoring DMA transfers to a memory associated with the processing circuit.

37. A method as defined in claim 28, wherein monitoring an operation comprises monitoring transfers to and from an asynchronous memory.

38. A method as defined in claim 28, wherein monitoring an operation comprises monitoring transfers to and from a synchronous memory.

39. A method as defined in claim 28, wherein monitoring an operation comprises monitoring an arbitration latency associated with the memory interface unit.

40. A method as defined in claim 28, wherein monitoring an operation comprises monitoring a latency through the memory interface unit.

41. A processing system as defined in claim 1, wherein the metrics information can be displayed on a display unit.

42. A processing system as defined in claim 1, wherein the metrics module further comprises a grant control field in a counter enable register.

* * * * *